US011955685B2

(12) United States Patent
Dooley

(10) Patent No.: US 11,955,685 B2
(45) Date of Patent: Apr. 9, 2024

(54) RADIO FREQUENCY (RF) CONDUCTIVE MEDIUM

(71) Applicant: Nanoton, Inc., Boston, MA (US)

(72) Inventor: John Aldrich Dooley, Boston, MA (US)

(73) Assignee: Nanoton, Inc., Boston, MA (US)

( * ) Notice: Subject to any disclaimer, the term of this patent is extended or adjusted under 35 U.S.C. 154(b) by 527 days.

(21) Appl. No.: 17/119,013

(22) Filed: Dec. 11, 2020

(65) Prior Publication Data

US 2021/0359385 A1 Nov. 18, 2021

Related U.S. Application Data

(60) Division of application No. 16/253,395, filed on Jan. 22, 2019, now abandoned, which is a continuation of (Continued)

(51) Int. Cl.

| | |
|---|---|
| ***H01B 1/24*** | (2006.01) |
| ***H01P 3/10*** | (2006.01) |
| ***H01P 3/16*** | (2006.01) |
| ***H01P 7/04*** | (2006.01) |
| ***H01P 7/06*** | (2006.01) |

(52) U.S. Cl.

CPC ................. *H01P 3/16* (2013.01); *H01B 1/24* (2013.01); *H01P 3/10* (2013.01); *H01P 7/04* (2013.01); *H01P 7/06* (2013.01)

(58) Field of Classification Search

CPC ..... H01P 3/10; H01P 7/04; H01P 7/06; H01B 1/14; H01B 1/20; H01B 1/24

See application file for complete search history.

(56) References Cited

U.S. PATENT DOCUMENTS 2,769,148 A 10/1956 Clogston
2,769,150 A 10/1956 Black et al.
(Continued)

FOREIGN PATENT DOCUMENTS

CN 1336793 A 2/2002
EP 0290148 A2 11/1988
(Continued)

OTHER PUBLICATIONS

Antonini, G. et al., "Skin and proximity effects modeling in micro-wires based on carbon nanotubes bundles", EMC Europe 2011 York, IEEE, Sep. 26, 2011, (Sep. 26, 2011), pp. 345-350, XP032020831, ISBN: 978-1-4577-1709-3.
(Continued)

*Primary Examiner* — Andrea Lindgren Baltzell
*Assistant Examiner* — Alan Wong
(74) *Attorney, Agent, or Firm* — Smith Baluch LLP

(57) ABSTRACT

Embodiments of the present disclosure provide a radio frequency (RF) conductive medium for reducing the undesirable insertion loss of all RF hardware components and improving the Q factor or "quality factor" of RF resonant cavities. The RF conductive medium decreases the insertion loss of the RF device by including one or more conductive pathways in a transverse electromagnetic axis that are immune to skin effect loss and, by extension, are substantially free from resistance to the conduction of RF energy.

3 Claims, 6 Drawing Sheets

Related U.S. Application Data application No. 15/986,044, filed on May 22, 2018, now Pat. No. 10,211,503, which is a continuation of application No. 15/016,632, filed on Feb. 5, 2016, now Pat. No. 10,008,755, which is a continuation of application No. 14/706,707, filed on May 7, 2015, now Pat. No. 9,893,404, which is a division of application No. 13/872,679, filed on Apr. 29, 2013, now Pat. No. 9,166,268.

(60) Provisional application No. 61/782,629, filed on Mar. 14, 2013, provisional application No. 61/640,784, filed on May 1, 2012.

(56) References Cited

U.S. PATENT DOCUMENTS 2,981,908 A 4/1961 Thompson, Jr. et al.
4,971,856 A * 11/1990 Karp ....................... H01J 23/30 428/209
5,213,715 A 5/1993 Patterson et al.
5,929,727 A 7/1999 Kagata et al.
6,148,221 A 11/2000 Ishikawa et al.
6,300,850 B1 10/2001 Kaegebein
6,433,408 B1 8/2002 Anjo et al.
6,498,550 B1 12/2002 Miller et al.
6,556,101 B1 4/2003 Tada et al.
6,650,208 B2 11/2003 Karhu
6,677,832 B1 1/2004 Guinn et al.
6,997,039 B2 2/2006 Rao et al.
7,218,266 B2 5/2007 Fujleda et al.
7,310,468 B2 12/2007 Kittaka et al.
7,463,121 B2 12/2008 D
7,795,536 B2 9/2010 Plourde et al.
7,947,773 B2 * 5/2011 Hansen .................... D04H 5/00 977/754
8,466,366 B2 * 6/2013 Srinivas .................. G06F 3/045 174/126.1
8,715,536 B2 5/2014 Wang et al.
8,741,424 B2 6/2014 Takahashi et al.
8,854,160 B2 10/2014 Park et al.
8,860,532 B2 10/2014 Gong et al.
9,166,268 B2 10/2015 Dooley
9,893,404 B2 2/2018 Dooley
9,920,207 B2 * 3/2018 Virkar ...................... H01B 1/02
9,976,042 B2 * 5/2018 Lee .......................... H01B 1/22
10,008,755 B2 6/2018 Dooley
10,211,503 B2 2/2019 Dooley
10,749,048 B2 * 8/2020 Allemand ........... H01L 31/1884
2005/0007001 A1 1/2005 Imholt et al.
2007/0228926 A1 10/2007 Teo et al.
2007/0281156 A1 12/2007 Lieber et al.
2009/0117269 A1 5/2009 Hansen et al.
2009/0160728 A1 6/2009 Emrick et al.
2009/0295644 A1 12/2009 Curran et al.
2009/0315644 A1 12/2009 Sheedy et al.
2011/0027986 A1 2/2011 Vecchione et al.
2011/0050516 A1 3/2011 Glabe et al.
2011/0062389 A1 3/2011 Wang et al.
2011/0121258 A1 5/2011 Hanein et al.
2011/0128097 A1 6/2011 Park et al.
2011/0241802 A1 10/2011 Joshi et al.
2011/0281070 A1 11/2011 Mittal et al.
2011/0316753 A1 12/2011 Wu et al.
2012/0055013 A1 3/2012 Finn
2012/0067871 A1 3/2012 Sherrer et al.
2013/0189502 A1 7/2013 Takahashi et al.
2014/0300204 A1 10/2014 Koyama et al.
2015/0244052 A1 8/2015 Dooley et al.
2016/0156089 A1 6/2016 Dooley et al.
2019/0157737 A1 5/2019 Dooley

FOREIGN PATENT DOCUMENTS

EP 2208750 A2 7/2010
FR 2874126 A1 2/2006
JP H0993005 A 4/1997
JP 2001196817 A 7/2001
JP 2004087924 A 3/2004
JP 2008287974 A 11/2008
JP 2011060751 A 3/2011
JP 2011167848 A 9/2011
JP 2011251406 A 12/2011
JP 4862969 B 1/2012
JP 2012054192 A 3/2012
JP 2012076968 A 4/2012
WO 9506336 A1 3/1995
WO 2010013982 A2 2/2010
WO 2012028686 A2 3/2012

OTHER PUBLICATIONS

Extended European Search Report in European Patent Application No. 19198693.4 dated Nov. 14, 2019, 6 pages.
Final Office Action dated Nov. 18, 2016 from U.S. Appl. No. 14/706,707, 13 pp.
Final Office Action dated Oct. 20, 2017 from U.S. Appl. No. 14/706,707, 16 pp.
Final Office Action dated Oct. 20, 2017 from U.S. Appl. No. 15/016,632, 25 pp.
G. Antonini ; A. Orlandi ; M. D'Amore, "Skin and proximity effects modeling in micro-wires based on carbon nanotube bundles", EMC Europe 2011 York, IEEE, (Sep. 26, 2011), ISBN 978-1-4577-1709-3, pp. 345-350, XP032020831.
Hong Li et al: "High-frequency effects in carbon nanotube interconnects and implications for on-chip inductor design," IEEE International Electron Devices Meeting, Dec. 15-17, 2008 ; San Francisco. CA. USA.
International Preliminary Report on Patentability and Written Opinion of the International Searching Authority in related PCT Application No. PCT/US2013/038628, filed Apr. 29, 2013, 10 pages, dated Nov. 4, 2014.
International Search Report in related PCT Application No. PCT/US2013/038628, filed Apr. 29, 2013, 10 pages, dated Nov. 7, 2013.
Li, H. et al., "High-frequency effects in carbon nanotube interconnects and implications for on-chip inductor design", IEEE International Electron Devices Meeting, 2008: IEDM 2008, San Francisco, CA, USA, Dec. 15-17, 2008, IEEE, Piscataway, NJ, USA, Dec. 15, 2008 (Dec. 15, 2008), pp. 1-4.
Non-Final Office Action dated Apr. 6, 2017 from U.S. Appl. No. 15/016,632, 28 Pages.
Non-Final Office Action dated Jun. 5, 2017 from U.S. Appl. No. 14/706,707, 16 pages.
Notice of Allowance dated Dec. 15, 2017 from U.S. Appl. No. 14/706,707, 7 pages.

* cited by examiner

RADIO FREQUENCY (RF) CONDUCTIVE MEDIUM

RELATED APPLICATIONS

This application is a division of U.S. application Ser. No. 16/253,395, filed Jan. 22, 2019, which is a continuation of U.S. application Ser. No. 15/986,044, filed May 22, 2018, which is a continuation of U.S. application Ser. No. 15/016,632, now U.S. Pat. No. 10,008,755, filed on Feb. 5, 2016, which is continuation of U.S. application Ser. No. 14/706,707, now U.S. Pat. No. 9,893,404, filed on May 7, 2015, which is a divisional of U.S. application Ser. No. 13/872,679, now U.S. Pat. No. 9,166,268, filed on Apr. 29, 2013, which in turn claims the benefit of both U.S. Provisional Application No. 61/782,629, filed on Mar. 14, 2013, and U.S. Provisional Application No. 61/640,784, filed on May 1, 2012. The entire teachings of the above applications are incorporated herein by reference.

BACKGROUND

Electromagnetic waves or electromagnetic radiation (EMR) is a form of energy that has both electric and magnetic field components. Electromagnetic waves can have many different frequencies.

Modern telecommunication systems manipulate electromagnetic waves in the electromagnetic spectrum in order to provide wireless communications to subscribers of the telecommunication systems. In particular, modern telecommunication systems manipulate those waves having a frequency categorizing them as Radio Frequency (RF) waves. In order to utilize RF waves, telecommunication systems utilize certain essential hardware components, such as filters, mixers, amplifiers, and antennas.

SUMMARY

The technology described herein relates to a radio frequency (RF) conductive medium for improving the conductive efficiency of an RF device. The RF conductive medium improves the conductive efficiency of the RF device by including one or more conductive pathways in a transverse electromagnetic axis that is free from the loss inducing impact of skin effect at the radio frequencies of interest.

One embodiment is a radio frequency (RF) conductive medium that includes a diversity of conductive media forming a plurality of continuous conductive pathways in a transverse electromagnetic axis. The RF conductive medium also includes a suspension dielectric periodically surrounding each of the plurality of continuous conductive pathways in the transverse electromagnetic axis. The suspension dielectric is configured to periodically insulate each of the plurality of conductive pathways from propagating RF energy in an axis perpendicular to the transverse electromagnetic axis. The suspension dielectric is further configured to provide mechanical support for each of the plurality of continuous conductive pathways.

In an embodiment, each of the plurality of continuous conductive pathways may be a conductive layer in a plurality of conductive layers of conductive pathways. Each of the plurality of conductive layers may be structured and have uniform position or arrangement with respect to other layers of the plurality of conductive layers. In another embodiment, each of the plurality of conductive layers may be unstructured and have a mesh arrangement with respect to other layers of the plurality of conductive layers.

In some embodiments, the transverse electromagnetic axis is an axis parallel to a surface upon which the RF conductive medium is applied. In other embodiments the transverse electromagnetic axis is an axis that is coplanar to a surface upon which the RF conductive medium is applied.

The RF conductive medium may also include a solvent configured to maintain the RF conductive medium in a viscous state during application of the RF conductive medium onto a dielectric surface. The solvent is configured to evaporate in response to being stimulated by a heat source.

Each medium of the diversity of conductive media may be made of a nanomaterial composed of an element that is at least one of: silver, copper, aluminum, and gold. Also, each medium of the diversity of conductive media may have a structure that is at least one of: wire, ribbon, tube, and flake.

In addition, each of the plurality of continuous conductive pathways may have a conductive cross-sectional area no greater than skin depth at a desired frequency of operation. In an embodiment, the skin depth "δ" may be calculated by:

$$\delta = \sqrt{\frac{2\rho}{(2\pi f)(\mu_0 \mu_r)}} \approx 503\sqrt{\frac{\rho}{\mu_r f}},$$

where $u_0$ is the permeability of a vacuum, $u_r$ is the relative permeability of a nanomaterial of the conductive media, p is the resistivity of the nanomaterial of the conductive media, and f is the desired frequency of operation.

The desired frequency of operation may correspond to at least one of: a desired resonant frequency of a cavity filter, a desired resonant frequency of an antenna, a cutoff frequency of a waveguide, a desired operational frequency range of a coaxial cable, and combined operational frequency ranges of an integrated structure including a cavity filter and an antenna.

Each of the plurality of continuous conductive pathways may have a uniform conductive cross-sectional area having a skin depth of 50 nm-4000 nm. In other examples, each of the plurality of continuous conductive pathways may have a uniform conductive cross-sectional area having a skin depth of 1000 nm-3000 nm. In yet another example, each of the plurality of continuous conductive pathways may have a uniform conductive cross-sectional area having a skin depth of 1500 nm-2500 nm.

The RF conductive medium may also include a protective layer covering the plurality of layers of continuous conductive pathways, where the protective layer includes a material that is non-conductive and minimally absorptive to RF energy at a desired frequency of operation. The material may be at least one of: a polymer coating and fiberglass coating.

Another embodiment is a radio frequency (RF) conductive medium that includes a diversity of conductive media forming a plurality of continuous conductive pathways. Each medium of the conductive media is made of a material that is conductive in a transverse electromagnetic axis and weakly conductive in an axis perpendicular to the transverse electromagnetic axis. The RF conductive medium also includes a layer of RF inert material surrounding the diversity of conductive media.

The RF inert material is non-conductive and minimally absorptive to RF energy at a desired frequency of operation. Also, the layer of RF inert material is configured to secure the diversity of conductive media onto a dielectric surface. The RF inert material may be at least one of: a polymer coating and fiberglass coating.

The RF conductive medium may also include a binding agent to bind the RF conductive medium to the surface. The RF conductive medium may further include a solvent configured to maintain the RF conductive medium in a viscous state during application of the RF conductive medium onto the dielectric surface. The solvent further is configured to evaporate in response to being stimulated by a heat source.

Each medium of the diversity of conductive media may be made of a nanomaterial composed of an element that is at least one of: carbon and graphene. Also, each conductive medium in the diversity of conductive media may be at least one of: single walled carbon nanotubes (SWCNTs), multi-walled carbon nanotubes (MWCNTs), and graphene.

In addition, each of the plurality of continuous conductive pathways may have a conductive cross-sectional area no greater than skin depth at a desired frequency of operation. In an embodiment, the skin depth "δ" may be calculated by:

$$\delta = \sqrt{\frac{2\rho}{(2\pi f)(\mu_0\mu_r)}} \approx 503\sqrt{\frac{\rho}{\mu_r f}},$$

where $u_0$ is the permeability of a vacuum, $u_r$ is the relative permeability of a nanomaterial of the conductive media, p is the resistivity of the nanomaterial of the conductive media, and f is the desired frequency of operation.

The desired frequency of operation may correspond to at least one of: a desired resonant frequency of a cavity filter, a desired resonant frequency of an antenna, a cutoff frequency of a waveguide, a desired operational frequency range of a coaxial cable, and combined operational frequency ranges of an integrated structure including a cavity filter and an antenna.

Each of the plurality of continuous conductive pathways may have a uniform conductive cross-sectional area having a skin depth of 50 nm-4000 nm. In other examples, each of the plurality of continuous conductive pathways may have a uniform conductive cross-sectional area having a skin depth of 1000 nm-3000 nm. In yet another example, each of the plurality of continuous conductive pathways may have a uniform conductive cross-sectional area having a skin depth of 1500 nm-2500 nm.

A further embodiment is a radio frequency (RF) conductive medium. The RF conductive medium includes a bundle of discrete electrically conductive nanostructures. In addition, the RF conductive medium includes a bonding agent enabling the bundle of discrete conductive nanostructures to be applied to a dielectric surface. The bundle of discrete conductive nanostructures form a continuous conductive layer having a uniform lattice structure and uniform conductive cross-sectional area in response to being sintered by a heat source. The heat source may apply a stimulation of heat based on an atomic structure and thickness of nanomaterial of each discrete conductive nanostructure of the bundle of discrete conductive nanostructures.

Each of the nanostructures may be made of a nanomaterial that is composed of an element that is at least one of: carbon, silver, copper, aluminum, and gold. Also, each of the discrete conductive nanostructures may be a conductive structure that is at least one of: wire, ribbon, tube, and flake.

The continuous conductive layer may have a uniform conductive cross-sectional area that is no greater than a skin depth at a desired frequency of operation. In an embodiment, the skin depth "δ" may be calculated by:

$$\delta = \sqrt{\frac{2\rho}{(2\pi f)(\mu_0\mu_r)}} \approx 503\sqrt{\frac{\rho}{\mu_r f}},$$

where $\mu_0$ is the permeability of a vacuum, $\mu_r$ is the relative permeability of a nanomaterial of the nanostructure, p is the resistivity of the nanomaterial of the nanostructure, and f is a desired frequency of operation.

The desired frequency of operation may correspond to at least one of: a desired resonant frequency of a cavity filter, a desired resonant frequency of an antenna, a cutoff frequency of a waveguide, a desired operational frequency range of a coaxial cable, and combined operational frequency ranges of an integrated structure including a cavity filter and an antenna.

The continuous conductive layer may have a uniform conductive cross-sectional area having a skin depth of 50 nm-4000 nm. In other examples, the continuous conductive layer may have a uniform conductive cross-sectional area having a skin depth of 1000 nm-3000 nm. In yet another example, the continuous conductive layer may have a uniform conductive cross-sectional area having a skin depth of 1500 nm-2500 nm.

The dielectric surface may have a surface smoothness free from irregularities greater than a skin depth in size. In an embodiment, the dielectric surface may have a surface smoothness with irregularities having a depth no greater than a depth "δ" that is calculated by:

$$\delta = \sqrt{\frac{2\rho}{(2\pi f)(\mu_0\mu_r)}} \approx 503\sqrt{\frac{\rho}{\mu_r f}},$$

where $u_0$ is the permeability of a vacuum, $u_r$ is the relative permeability of a nanomaterial of the nanostructure, p is the resistivity of the nanomaterial of the nanostructure, and f is a frequency (in Hz) of interest.

The RF conductive medium also includes a protective layer covering the continuous conductive layer. The protective layer includes a material that is non-conductive and minimally absorptive to RF energy at a desired frequency of operation. The material may be at least one of: a polymer coating and a fiberglass coating.

The dielectric surface may be an inner surface of a cavity having an internal geometry corresponding to a desired frequency response characteristic of the cavity. In another embodiment, the bundle of discrete nanostructures may be applied to an outer surface of a first dielectric surface and to a concentric inner surface of a second dielectric surface. The first dielectric surface is an inner conductor and the second dielectric surface is an outer conductor of a coaxial cable. Also, the bundle of discrete conductive nanostructures may be applied to a dielectric structure, where the geometry of the dielectric structure and conductive properties of the bundle of discrete conductive nanostructures define a resonant frequency response and radiation pattern of an antenna.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the disclosure follows.

Modern telecommunication systems manipulate electromagnetic waves having a range of wavelengths in the electromagnetic spectrum that categorize them as Radio Frequency (RF) waves. In order to utilize RF waves, telecommunication systems employ certain essential RF hardware components such as filters, mixers, amplifiers, and antennas.

The RF hardware components interact with the RF waves via RF conductive elements. The RF conductive elements are generally composed of an RF conductive medium, such as, aluminum, copper, silver, and gold. However, the structures of conventional RF conductive media suffer from effective electrical resistance that impedes the conduction of RF energy, introducing undesirable insertion loss into all RF hardware components and lowering the Q factor of specific RF hardware components like resonant cavity filters.

The principal physical mechanism for undesirable loss in the conduction of RF energy through RF hardware components is skin effect. Skin effect occurs due to counter-electromotive force in a conductor, which is a consequence of the alternating electron currents in the conductive medium induced by applied RF energy. As its name suggests, skin effect causes the majority of electron current to flow at the surface of the conductor, a region defined as the "skin depth." Skin effect reduces the effective cross sectional area of a conductor, often to a small fraction of its physical cross section. The effective skin depth of a conductor is a frequency dependent quality, which is inversely proportional to wavelength. This means that the higher the frequency, the more shallow the skin depth and, by extension, the greater the effective RF conduction loss.

The technology described herein relates to a radio frequency (RF) conductive medium (hereinafter, "technology") for reducing the RF conduction loss of an RF hardware component. The RF conductive medium created by this technology reduces the RF conduction loss of the RF device by frustrating the formation of counter-electromotive force in the conductor.

For context and without limitation, the technology herein is described in the context of an RF cavity resonator. However, it should be noted that the technology can be applied to any RF component requiring an RF conductive medium configured to interact with RF waves. For example, the RF component can be an antenna, waveguide, coaxial cable, and an integrated structure including a cavity filter and an antenna.

Figure 1:
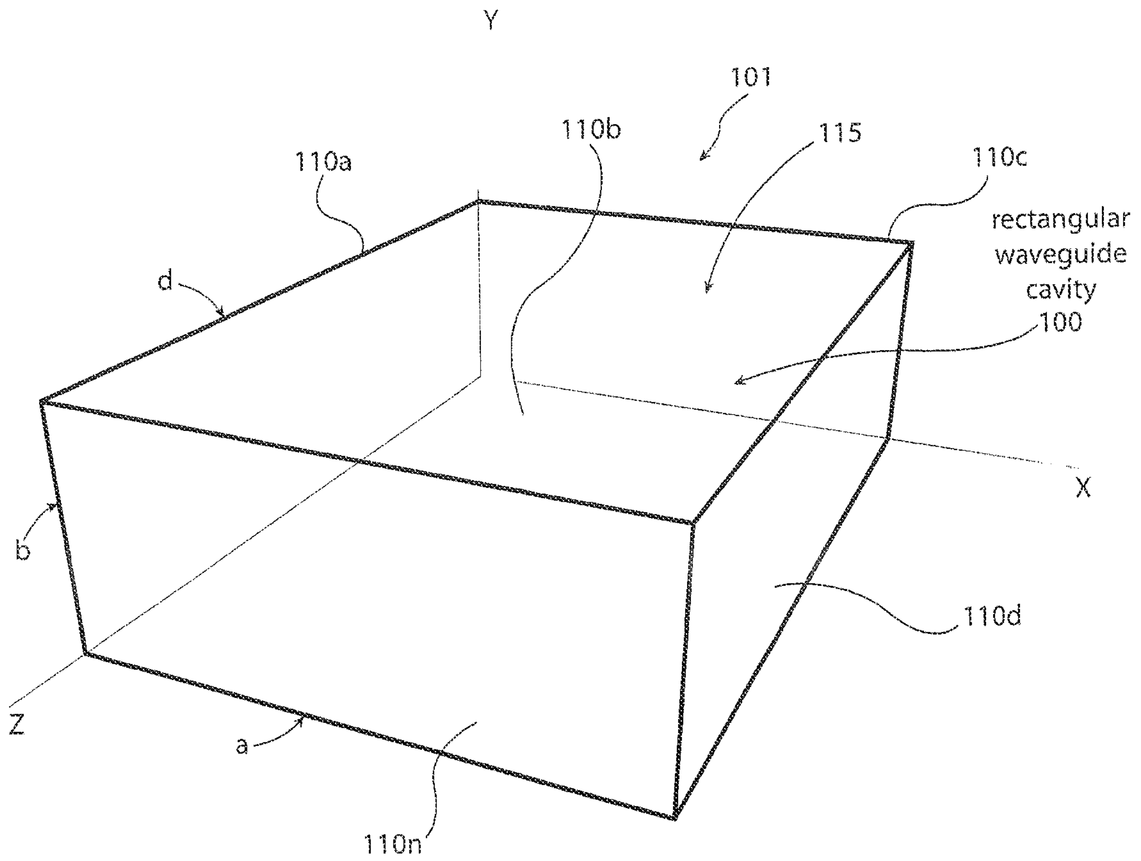
FIG. 1 is a schematic diagram of a rectangular waveguide cavity in accordance with an example embodiment of the present disclosure.

FIG. 1 is a schematic diagram of a rectangular radio frequency (RF) waveguide cavity filter 101. The RF cavity filter 101, as most RF cavity resonators, is typically defined as a "closed metallic structure" that confines radio frequency electromagnetic fields in a cavity 100 defined by walls 110*a-n*. The cavity filter 101 acts as a low loss resonant circuit with a specific frequency response and is analogous to a classical resonant circuit composed of discrete inductive (L) and capacitive (C) components. However, unlike conventional LC circuits, the cavity filter 101 exhibits extremely low energy loss at the filter's design wavelength (i.e., physical internal geometry of the cavity filter 101). This means that the Q factor of the cavity filter 101 is hundreds of times greater than that of a discrete component resonator such as an LC "tank" circuit.

The Q factor of any resonant circuit or structure (e.g., cavity filter 101) measures the degree to which the resonant circuit or structure damps energy applied to it. Thus, Q factor may be expressed as a ratio of energy stored in the resonant circuit or structure to energy dissipated in the resonant circuit or structure per oscillation cycle. The less energy dissipated per cycle, the higher the Q factor. For example, the Q factor "Q" can be defined by:

$$Q = 2\pi \times \frac{\text{Energy Stored}}{\text{Energy dissipated per cycle}} = 2\pi f_r \times \frac{\text{Energy Stored}}{\text{Power Loss}}, \quad \text{EQN. 1}$$

where $f_r$ is resonant frequency of the circuit or structure.

The Q factor of the cavity filter 101 is influenced by two factors: (a) power losses in a dielectric medium 115 of the cavity filter 101 and (b) power losses in the walls 110*a-n* of the cavity filter 101. In practical applications of cavity resonator based filters such as cavity filter 101, the dielectric medium 115 is often air. Losses induced by air can be considered miniscule at the frequencies in the lower microwave spectrum commonly used for mobile broadband communications. Thus, conductor losses in the walls 110*a-n* of the cavity filter 101 contribute most to lower effective Q factor and higher insertion loss of the cavity filter 101.

For instance, the Q factor "Q" of the cavity filter 101 can be defined by:

$$Q = \left(\frac{1}{Q_c} + \frac{1}{Q_d}\right)^{-1}, \quad \text{EQN. 2}$$

where $Q_c$ is the Q factor of the cavity walls and $Q_d$ is the Q factor of the dielectric medium.

As stated above, the RF conduction losses of the dielectric medium (e.g., air) 115 is negligible because RF energy in the lower microwave spectrum is weakly interactive with air and other common cavity dielectrics. Thus, the RF conductivity of the walls 110*a-n* "$Q_c$" of the cavity filter 101 contributes most to the quality factor "Q" of the cavity filter 101. The quality factor contribution of the RF conductivity of the walls 110*a-n* "$Q_c$" can be defined by:

$$Q_c = \frac{(kad)^3 b\eta}{2\pi^2 R_s} \frac{1}{2l^2 a^3 b + 2bd^3 + l^2 a^3 d + ad^3}, \quad \text{EQN. 3}$$

where k=wavenumber; n=dielectric impedance, $R_s$=surface resistivity of the cavity walls 110*a-n*, and a/b/d are physical dimensions of the cavity filter 101. Thus, an increasing value of surface resistivity "$R_s$" of the cavity walls 110*a-n* decreases the value of $Q_c$, thereby, reducing the Q factor of the cavity filter 101.

In order to increase the Q factor of the cavity filter 101 and other RF device, embodiments of the present invention provide a RF conductive medium that reduces the surface resistivity "$R_s$" of RF conductive elements of RF devices such as the cavity filter 101.

Figure 2:
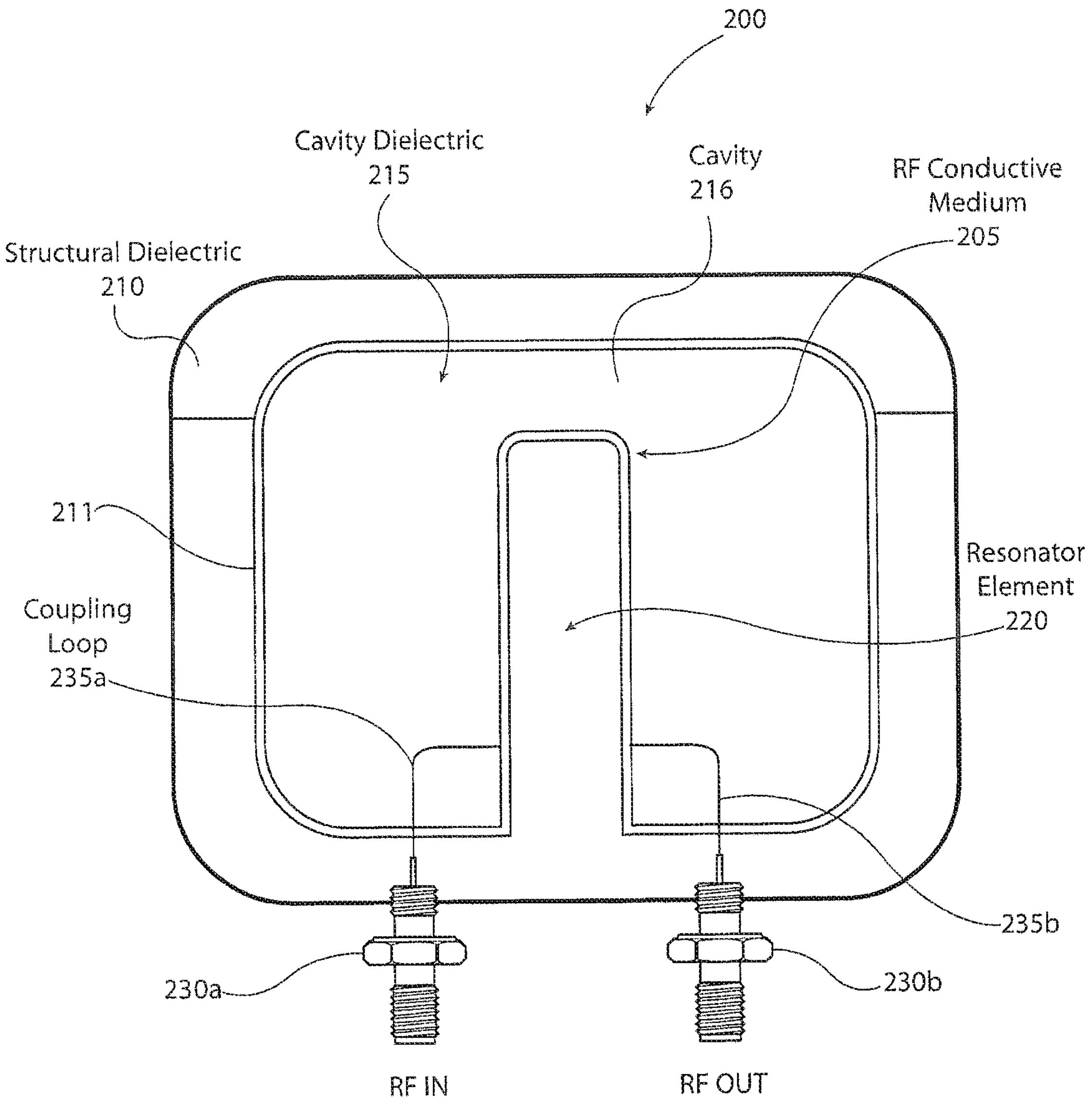
FIG. 2 is a schematic diagram of a cavity resonator including a radio frequency (RF) conductive medium in accordance with an example embodiment of the present disclosure.

FIG. 2 is a schematic diagram of a radio frequency (RF) cavity resonator 200 including a radio frequency (RF) conductive medium 205. The cavity resonator 200 includes a structural dielectric 210. The structural dielectric 210 defines a cavity 216. The cavity 216 has an internal geometry corresponding to a desired frequency response characteristic of the cavity resonator 200. In particular, the internal geometry reinforces desired radio frequencies and attenuates undesired radio frequencies.

The structural dielectric 210 is composed of a material with a low relative permittivity. Also, the material of the structural dielectric 210 has a high conformality potential. For instance, the material of the structure dielectric 210 enables the structural dielectric 210 to conform to complex and smoothly transitioning geometries. The material of the structural dielectric 210 also has high dimensional stability under thermal stress. For example, the material prevents the structural dielectric 210 from deforming under thermal stresses the cavity resonator may experience in typical operational environments. In another embodiment, the material of the structural dielectric 210 has high dimensional stability under mechanical stress such that the material prevents the structural dielectric 210 from denting, flexing, or otherwise mechanically deforming under mechanical stresses experienced in typical operational applications.

In addition, the structural dielectric 210 has an internal surface 211 with a high surface smoothness. In particular, the internal surface 211 is substantially free from surface irregularities. In an embodiment, the dielectric surface 211 may a surface smoothness with irregularities having a depth no greater than a depth "δ" at a desired frequency of operation of the radio frequency (RF) cavity resonator 200.

The cavity resonator 200 also includes an RF input port 230*a* and RF output port 230*b*. In an example, the RF input port 230*a* and RF output port 230*b* can be a SubMiniature version A (SMA) connector. The RF input port 230*a* and RF output port 230*b* can be made of an RF conductive material such as copper, gold, nickel, and silver.

The RF input port 230*a* is electrically coupled to a coupling loop 235*a*. The RF input port 230*a* receives an oscillating RF electromagnetic signal from an RF transmission medium such as a coaxial cable (not shown). In response to receiving the oscillating RF electromagnetic signal, the RF input port 230*a* via the coupling loop 235*a* radiates an oscillating electric and magnetic field (i.e., RF electromagnetic wave) corresponding to the received RF electromagnetic signal.

As stated herein, the cavity 216 has an internal geometry corresponding to a desired frequency response characteristic of the cavity resonator 200. In particular, the internal geometry reinforces a range of radio frequencies corresponding to the desired frequency response characteristic of the cavity resonator 200 and attenuates undesired radio frequencies. In addition, the cavity resonator 200 also includes a resonator element 220. The resonator element 220, in this example, is formed by the structural dielectric 210. However, it should be noted that the resonator element 220 can be a separate and distinct structure within the cavity resonator 200. The resonator element 220 has a resonant dimension and overall structural geometry that further reinforces desired radio frequencies and attenuates undesired radio frequencies.

The electromagnetic wave corresponding to the received RF electromagnetic signal induces a resonant mode or modes in the cavity 216. In doing so, the electromagnetic wave interacts with the RF conductive medium 205. In particular, the electromagnetic wave induces an alternating current (AC) in the RF conductive medium 205. As described herein, embodiments of the present disclosure provide an RF conductive medium 205 that has a structure and composition giving the RF conductive medium 205 a low effective surface conductive resistivity "$R_s$". The low surface conductive resistivity "$R_s$" allows the RF conductive medium 205 to support resonant modes in the cavity 216 with a high level of efficiency, thereby increasing the quality factor "Q" of the cavity resonator 200.

The reinforced frequency of interest induces an AC signal in the coupling loop 235*b*. The AC signal is output from the cavity resonator 200 via the RF output 230*b*. The RF output 230*b* is electrically coupled to a transmission medium (not shown), which passes the AC signal to an RF hardware component such as an antenna or receiver.

The RF conductive medium 205 can also include a protective layer (e.g., layer 306 of FIG. 4) covering the RF conductive medium. The protective layer can be composed of a material that is non-conductive and minimally absorptive to RF energy at a desired frequency of operation the of the cavity resonator 200. The material may be at least one of: a polymer coating and a fiberglass coating.

Figure 3:
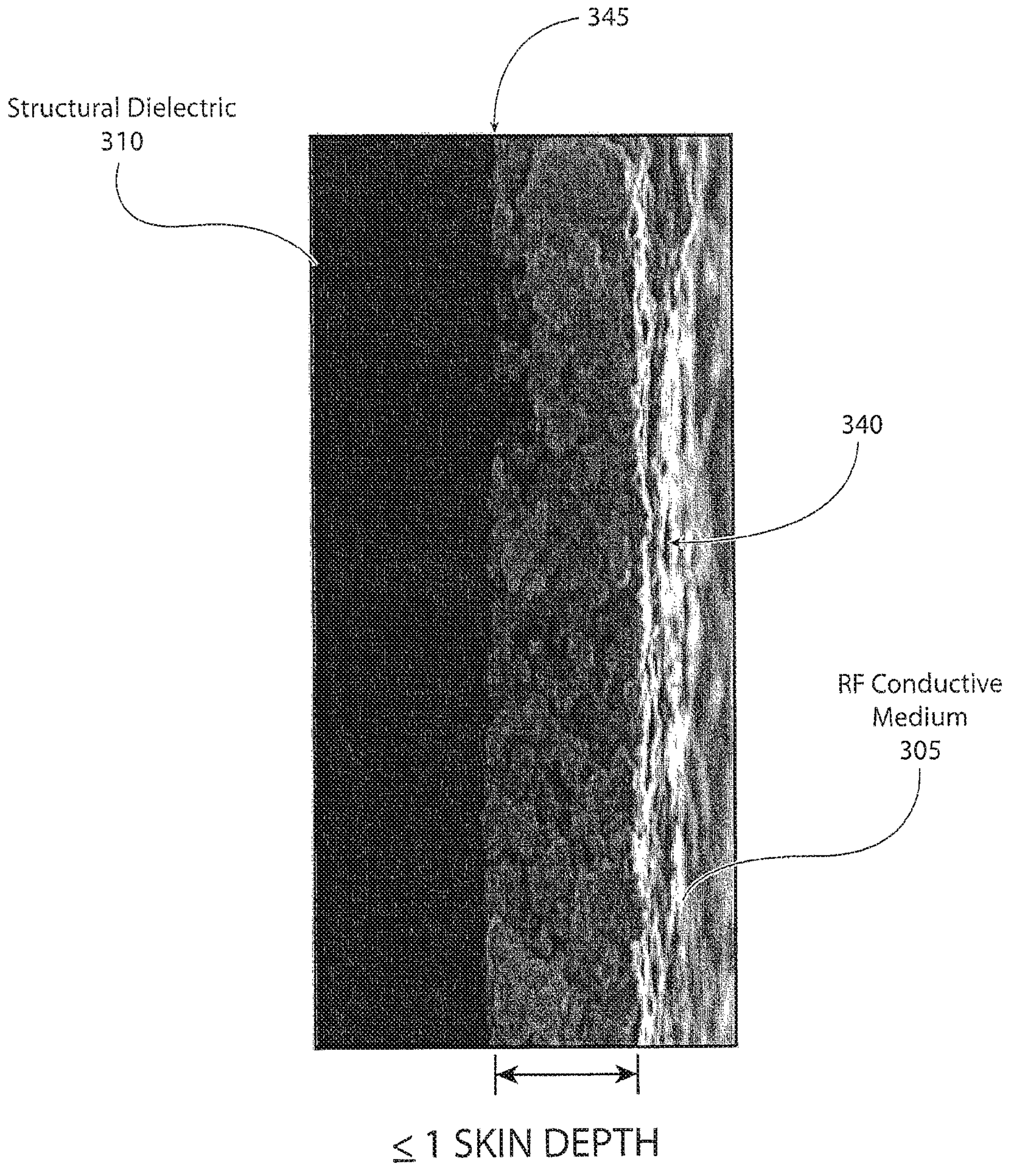
FIG. 3 is a schematic diagram of a RF conductive medium that is composed of a bundle of discrete conductive nanostructures forming a continuous conductive layer in accordance with an example embodiment of the present disclosure.

FIG. 3 is a schematic diagram of a RF conductive medium 305 that is composed of a bundle of discrete conductive nanostructures forming a continuous conductive layer 340 in accordance with an example embodiment of the present disclosure.

The RF conductive medium 305 includes a bundle of discrete electrically conductive nanostructures. Each of the nanostructures may be made of a nanomaterial that is composed of an element that is at least one of: carbon, silver, copper, aluminum, and gold. Also, each of the discrete conductive nanostructures may be a conductive structure that is at least one of: wire, ribbon, tube, and flake. The nanomaterial may have a sintering temperature that is a small fraction of a melting temperature of the material on a macro scale. For example, Silver (Ag) melts at 961° C., while nano Silver (Ag) may sinter well below 300° C.

In addition, the RF conductive medium 305 includes a bonding agent (not shown) enabling the bundle of discrete conductive nanostructures to be applied to a surface 345 of the structural dielectric 310. The bundle of discrete conductive nanostructures forms the continuous conductive layer 340 in response to being sintered by a heat source. The size of each of the discrete electrically conductive nanostructures may be chosen such that the continuous conductive layer 340 has a uniform conductive cross-sectional area that is no greater than a skin depth "δ" at a desired frequency of operation of the cavity resonator 200. The continuous conductive layer 340 has a uniform lattice structure and uniform conductive cross-sectional area. The heat source may apply a stimulation of heat based on an atomic structure and thickness of nanomaterial of each discrete conductive nanostructure of the bundle of discrete conductive nanostructures. For example, the temperature of heat applied by the heat source and the length of time the heat is applied is a function of the atomic structure and thickness of nanomaterial of each discrete conductive nanostructure of the bundle of discrete conductive nanostructures. Any heat source known or yet to be known in the art may be used.

As stated above, an RF electromagnetic wave induces an alternating current (AC) in the RF conductive medium 305. For AC, an influence of the structure's cross sectional area on AC resistance is radically different than for direct current (DC) resistance. For example, a direct current may propagate throughout an entire volume of a conductor; an alternating current (such as that produced by an RF electromagnetic wave) propagates only within a bounded area very close to a surface of the conductive medium. This tendency of alternating currents to propagate near the surface of a conductor is known as "skin effect." In an RF device, such as the cavity resonator 200, skin effect reduces the usable conductive cross sectional area to an extremely thin layer at the surface of the cavity's inner structure. Thus, skin effect is at least one significant mechanism for RF conduction loss in a resonant cavity, reducing the cavity's Q factor.

Thus, the continuous conductive layer 340 may have a uniform conductive cross-sectional area that is no greater than a skin depth "δ" at a desired frequency of operation of a cavity resonator (e.g., the cavity resonator 200 of FIG. 2). In an embodiment, the skin depth "δ" may be calculated by:

$$\delta = \sqrt{\frac{2\rho}{(2\pi f)(\mu_0\mu_r)}} \approx 503\sqrt{\frac{\rho}{\mu_r f}}, \qquad \text{EQN. 4}$$

where $\mu_0$ is the permeability of a vacuum, $\mu_r$ is the relative permeability of a nanomaterial of the nanostructure, p is the resistivity of the nanomaterial of the nanostructure, and f is the desired frequency of operation. Table 1 below illustrates an example application of EQN. 4 with respect to a set of radio frequencies. However, it should be noted that any other known or yet to be known method of determining skin depth "δ" can used in place of EQN. 4.

TABLE 1

| | Frequency | | | | |
|---|---|---|---|---|---|
| | 700 MHz | 800 MHz | 1900 MHz | 2100 MHz | 2500 MHz |
| Skin Depth | 2870 nm | 2690 nm | 1749 nm | 1660 nm | 1520 nm |

In an embodiment, the continuous conductive layer 340 may have a uniform conductive cross-sectional area having a skin depth of 50 nm-4000 nm. In another embodiment, the continuous conductive layer 340 may have a uniform conductive cross-sectional area having a skin depth of 1000 nm-3000 nm. In yet another example, the continuous conductive layer 340 may have a uniform conductive cross-sectional area having a skin depth of 1500 nm-2500 nm.

Figure 4A:
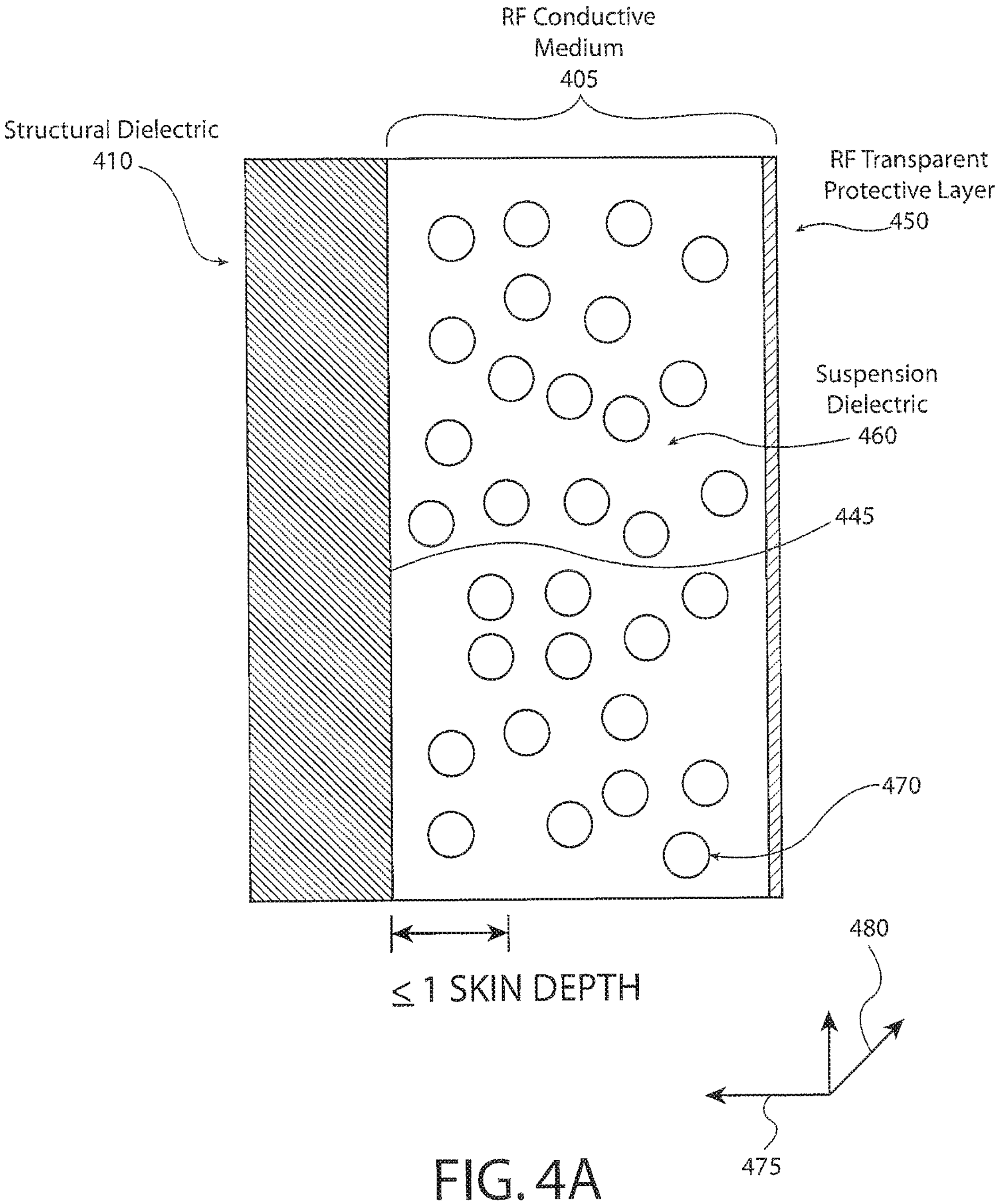
FIGS. 4A-B are cross-sectional views of an RF conductive medium applied onto a surface of a structural dielectric in accordance with an example embodiment of the present disclosure.

FIG. 4A is a cross-sectional view an RF conductive medium 405 applied onto a surface 445 of a structural dielectric 410. In particular, the cross-sectional view is in an orientation such that the axis 475 (i.e., going to right to left on the figure) is an axis perpendicular to a transverse electromagnetic axis 480 (i.e., an axis going into the figure). The RF conductive medium 405 includes a diversity of conductive media 470. The diversity of conductive media 470 form a plurality of continuous conductive pathways (e.g., continuous conductive pathways 490*a-n* of FIG. 4B) in the transverse electromagnetic axis 480.

Each medium of the diversity of RF conductive media 470 is made of a nanomaterial composed of an element that is at least one of: silver, copper, aluminum, carbon, and graphene. In an example where the element is at least one of: silver, copper, and aluminum, each medium of the diversity of conductive media 470 has a structure that is at least one of wire, ribbon, tube, and flake. In an example where the element is at least one of: carbon and graphene, each conductive medium in the diversity of conductive media 470 is at least one of: single walled carbon nanotubes (SWCNTs), multi-walled nanotubes (MWCNTs), and graphene.

Also, each of the plurality of continuous conductive pathways 490*a-n* may have a conductive cross-sectional area no greater than skin depth at a desired frequency of operation of, for example, a cavity resonator (e.g., the cavity resonator 200 of FIG. 2). In an embodiment, the skin depth "δ" may be calculated per EQN. 4.

In an embodiment, each of the plurality of continuous conductive pathways may have a uniform conductive cross-sectional area having a skin depth of 50 nm-4000 nm. In other examples, each of the plurality of continuous conductive pathways may have a uniform conductive cross-sectional area having a skin depth of 1000 nm-3000 nm. In yet another example, each of the plurality of continuous conductive pathways may have a uniform conductive cross-sectional area having a skin depth of 1500 nm-2500 nm.

It should be noted that the desired frequency of operation "f" may also correspond to at least one of: a desired resonant frequency of an antenna, a cutoff frequency of a waveguide, a desired operational frequency range of a coaxial cable, and combined operational frequency ranges of an integrated structure including a cavity filter and an antenna.

A suspension dielectric 460 periodically surrounds each of the plurality of the plurality of conductive pathways 490*a-n* in the transverse electromagnetic axis. In particular, the suspension dielectric 460 periodically insulates each of the plurality of conductive pathways 490*a-n* from propagating RF energy in the axis 475 (i.e., the axis perpendicular to the transverse electromagnetic axis 480). The suspension dielectric 460 can also be configured to provide mechanical support for each of the plurality of conductive pathways 490*a-n*.

In an example embodiment where each medium of the diversity of RF conductive media 470 is made of a nanomaterial composed of an element that is at least one of: silver, copper, and aluminum, the suspension dielectric 460 is composed of a structurally rigid and thermally stable material that is weakly interactive with RF energy at the desired frequency of operation.

In another example embodiment where each medium of the diversity of RF conductive media 470 is made of a nanomaterial composed of an element that is at least one of: carbon and graphene, the suspension dielectric 460 is air. In such a case, the suspension dielectric 460 can be composed of air because, for example, single walled carbon nanotubes (SWCNTs), multi-walled nanotubes (MWCNTs), and graphene are materials that are inherently conductive in the transverse electromagnetic axis 480 and weakly conductive in the axis 475.

In this example, the RF conductive medium 405 includes an RF transparent protective layer 450. The RF transparent protective layer 450 covers the plurality of continuous conductive pathways 490*a-n*. The protective layer 405 includes a material that is non-conductive and minimally absorptive to RF energy at a desired frequency of operation of, for example, a cavity resonator (e.g., the cavity resonator 200 of FIG. 2). In an example embodiment, the material can be at least one of a polymer coating and fiberglass coating. Although, in this example, the RF conductive medium 405 includes the RF transparent protective layer 450, other example embodiments of the RF conductive medium 405 may not include the RF transparent protective layer 450.

The RF conductive medium 405 may also include a binding agent (not shown). The binding agent is configured to bind the RF conductive medium 405 to the surface 445 of the structural dielectric 410. In addition, the RF conductive medium 405 may also include a solvent (not shown). The solvent is configured to maintain the RF conductive medium 405 in a viscous state during application of the RF conductive medium 405 onto the surface 445. The solvent is further configured to evaporate in response to being stimulated by a heat source. The heat source, in an example, can be an ambient temperature of air surrounding the RF conductive medium 405.

Figure 4B:
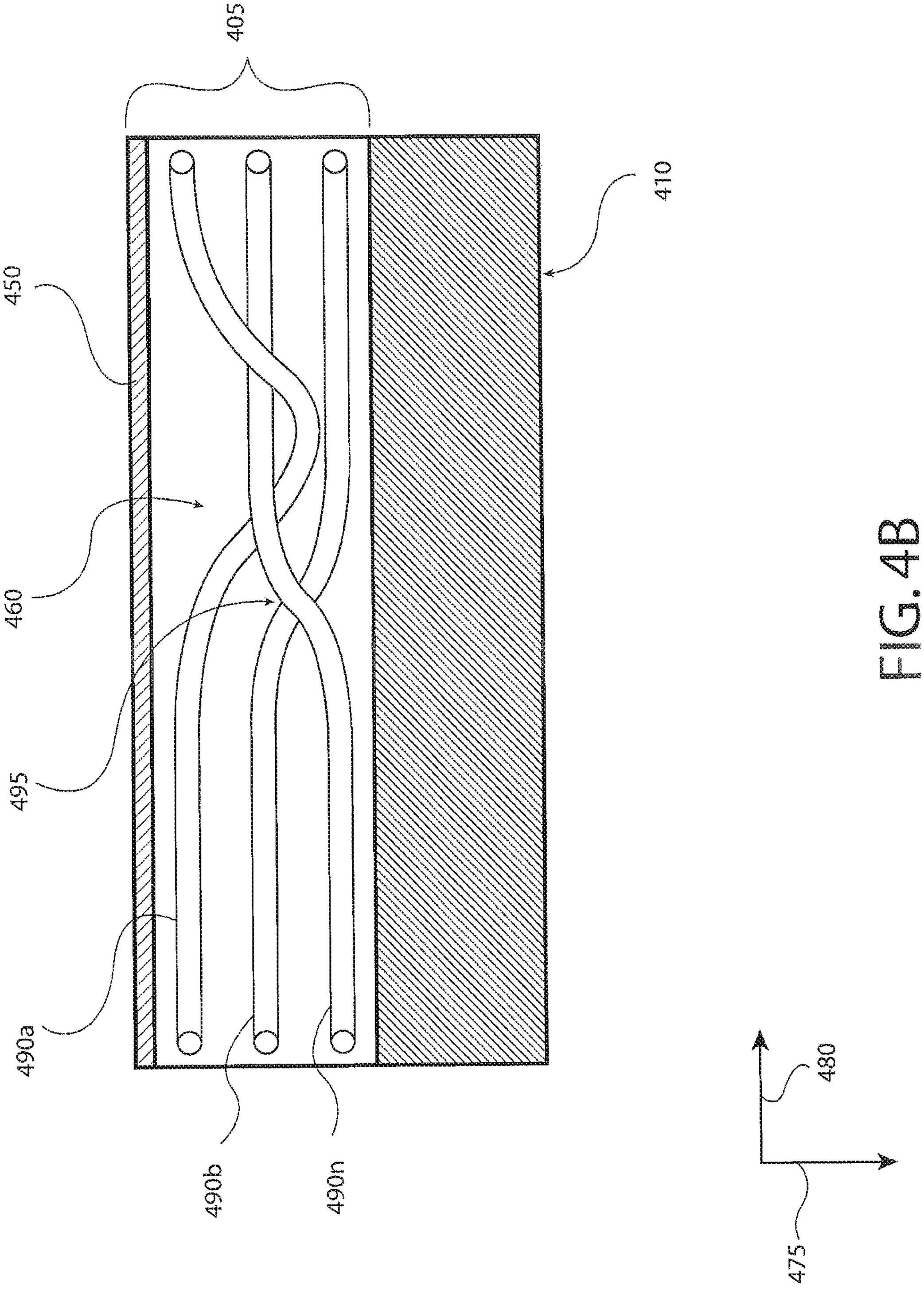

FIG. 4B is a cross-sectional view the RF conductive medium 405 applied onto a surface 445 of a structural dielectric 410. In particular, the cross-sectional view is in an orientation such that the axis 475 (i.e., going up and down on the figure) is an axis perpendicular to a transverse electromagnetic axis 480 (i.e., an axis going left to right on the figure). As illustrated, the plurality of continuous conductive pathways 490*a-n* is oriented in the transverse electromagnetic axis 480, such that RF electromagnetic waves induce alternating currents that only predominately travel in the transverse electromagnetic axis 480 along each of the pathways 490*a-n*.

In order for the alternating current to only predominately travel in the transverse electromagnetic axis 480 along each of the pathways 490*a-n*, the suspension dielectric 460 periodically surrounds each of the plurality of conductive pathways 490*a-n*. In particular, the suspension dielectric periodically insulates each of the plurality of conductive pathways 490*a-n* from propagating RF energy (e.g., alternating current), in the axis 475. At certain points, for example point 495, the suspension dielectric 460 provides avenues for the RF energy to pass from one pathway (e.g., pathway 409*b*) to another pathway (e.g., pathway 490*n*).

In embodiments where each of the continuous conductive pathways 490*a-n*, as described above, has a conductive cross-sectional area no greater than a skin depth "δ" at a desired frequency of operation of an RF device (e.g., the cavity resonator 200 of FIG. 2), the periodic RF insulation provided by the suspension dielectric 460 enables the RF conductive medium 405 to have an increased cross sectional area for RF conductivity, whose constituent elements (e.g., pathways 490*a-n*) do not suffer from skin effect loss.

Figure 5:
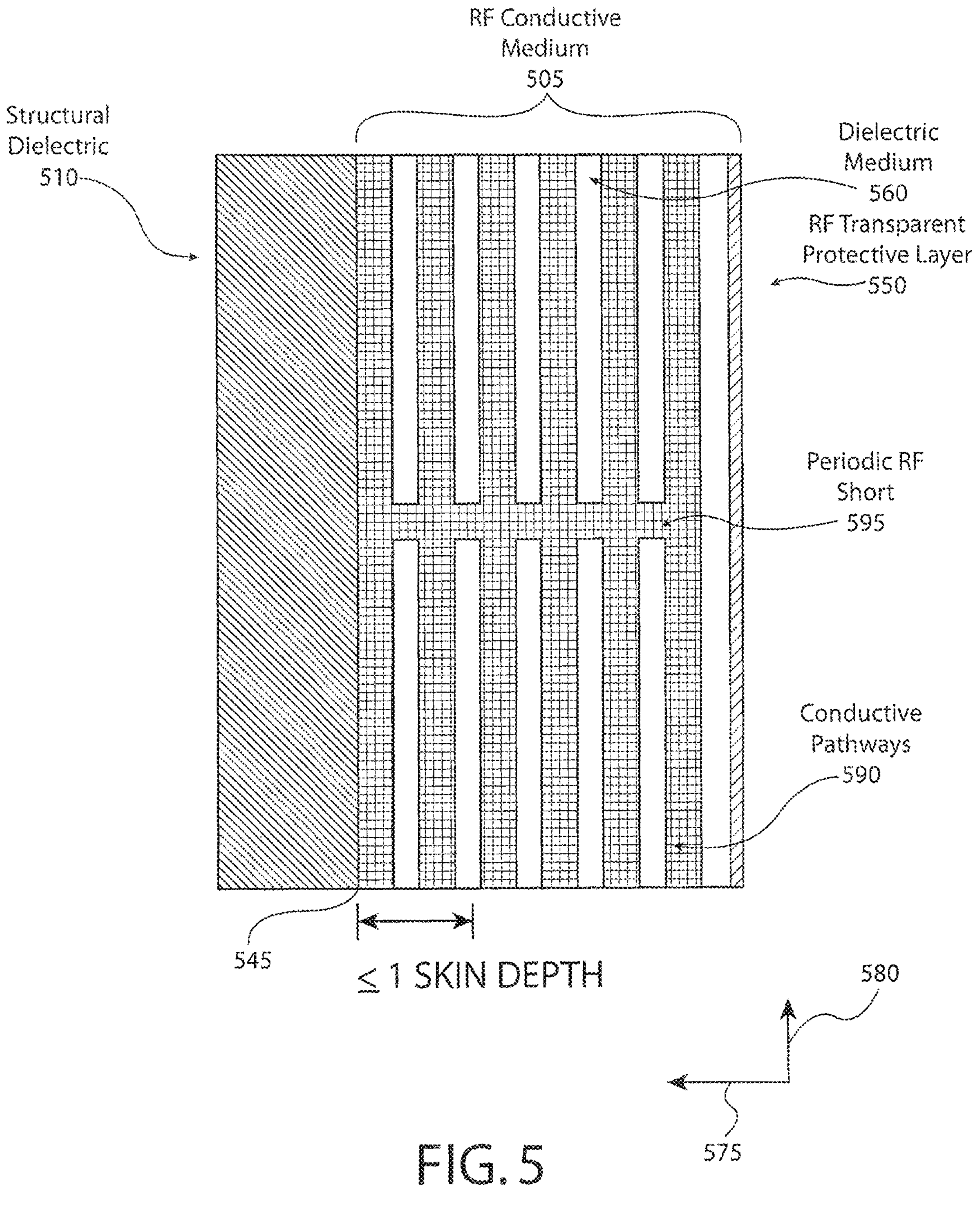
FIG. 5 is a cross-sectional view of a highly structured RF conductive medium applied onto a surface of a structural dielectric in accordance with an example embodiment of the present disclosure.

FIG. 5 is a cross-sectional view of an RF conductive medium 505 that includes an RF transparent protective layer 550 (e.g., protective layer 450 of FIGS. 4A-B) applied to a surface 545 of a structural dielectric 510 of an RF device (e.g., the cavity resonator 200 of FIG. 2). In particular, the cross-sectional view is in an orientation such that the axis 575 (i.e., going right to left on the figure) is an axis perpendicular to a transverse electromagnetic axis 580 (i.e., an axis going up and down on the figure). The RF conductive medium 505 includes a plurality of continuous conductive pathways 590 oriented in the transverse electromagnetic axis 580, such that RF electromagnetic waves induce alternating currents that predominately only travel in the transverse electromagnetic axis 580 along each of the pathways 590*a-n*.

A diversity of conductive media is structured and periodically arranged to form a structured arrangement of the plurality of continuous conductive pathways 590. Each of the plurality of continuous conductive pathways 590 is periodically insulated from a neighboring continuous conductive pathway by a dielectric medium 560 (e.g., a suspension dielectric 460 of FIGS. 4A-B). The dielectric medium 560 periodically insulates each of the plurality of conductive pathways 590 from propagating RF energy (e.g., alternating current), in the axis 575. At certain points, an RF short 595 provides avenues for the RF energy to pass from one pathway to another pathway. Although a single RF short 595 that traverses each of the plurality of continuous conductive pathways 590 is illustrated, it should be noted that other embodiments can have periodically staggered RF shorts between each of the plurality of continuous conductive pathways.

In embodiments where each of the continuous conductive pathways 590, as described above, has a conductive cross-sectional area no greater than a skin depth "δ" at a desired frequency of operation of an RF device (e.g., the cavity resonator 200 of FIG. 2), the periodic RF insulation provided by the dielectric medium 560 enables the RF conductive medium 505 to have an increased cross sectional area for RF conductivity, whose constituent elements (e.g., pathways 590) do not suffer from skin effect loss.

The teachings of all patents, published applications and references cited herein are incorporated by reference in their entirety.

While this disclosure has been particularly shown and described with references to example embodiments thereof, it will be understood by those skilled in the art that various changes in form and details may be made therein without departing from the scope of the disclosure encompassed by the appended claims.

The invention claimed is:

1. A method, comprising:

applying a radio frequency (RF) conductive medium to a surface of a substrate, the RF conductive medium comprising:

a solvent to maintain the RF conductive medium in a viscous state during said applying;

a dielectric material; and a plurality of conductive pathways disposed in the dielectric material; and heating the RF conductive medium to vaporize the solvent, wherein each conductive pathway in the plurality of conductive pathways has a diameter no greater than a skin depth δ of the RF conductive medium at a desired frequency of operation, and wherein the surface of the substrate includes irregularities having a depth no greater than the skin depth δ at the desired frequency of operation.

2. The method of claim 1, wherein the dielectric material, upon said applying of the RF conductive medium to the surface of the substrate, periodically surrounds and insulates each conductive pathway of the plurality of conductive pathways as a suspension dielectric.

3. The method of claim 1, wherein the applying the RF conductive medium to the surface of the substrate includes applying the RF conductive medium on to a surface of a structural dielectric layer of the substrate.

* * * * *